T. A. JACKSON.
ENDLESS SAW.
APPLICATION FILED JULY 8, 1919. RENEWED APR. 29, 1921.
1,392,503.  Patented Oct. 4, 1921.
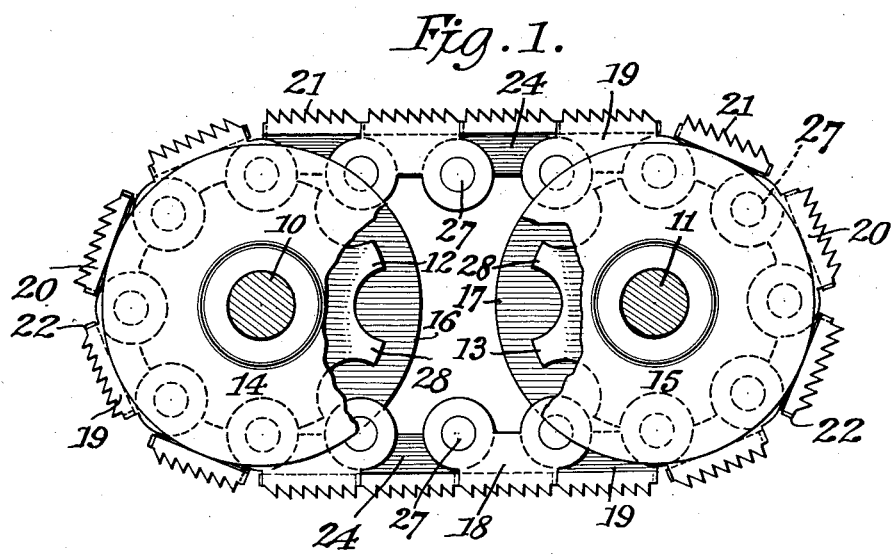
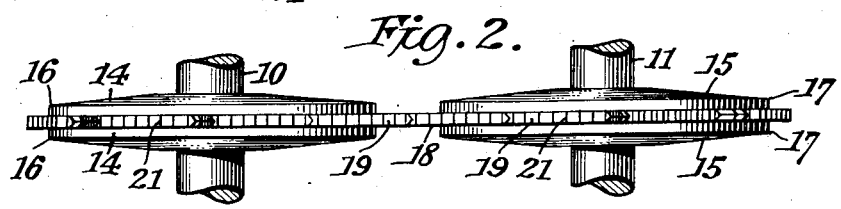
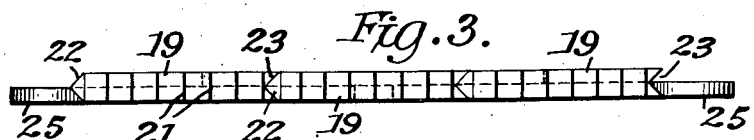
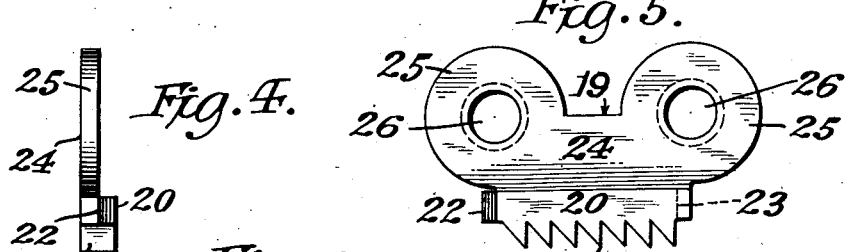
Inventor,
THADDEUS A. JACKSON,
By his Attorney
A. R. Appleman

UNITED STATES PATENT OFFICE.

THADDEUS A. JACKSON, OF BROOKLYN, NEW YORK.

ENDLESS SAW.

1,392,503. Specification of Letters Patent. Patented Oct. 4, 1921.

Application filed July 8, 1919, Serial No. 309,469. Renewed April 29, 1921. Serial No. 465,502.

*To all whom it may concern:*

Be it known that I, THADDEUS A. JACKSON, a citizen of the United States, residing in the borough of Brooklyn, city of New York, State of New York, have invented a certain new and useful Improvement in Endless Saws, which is without longitudinal guide in operation of sawing and which can be fed by continuous feed motion positive or by gravity, of which invention the following is a specification, reference being had to the accompanying drawing, which constitutes a part of this specification.

This invention relates to endless chain saws for cutting metals and the like.

A principal object being to provide an endless saw constructed so that a constant and uniform travel of the several connected cutting units is obtained, said units being constituted by link structures having a thickened edge provided with cutting teeth and, at the ends, each with a male rib and a female groove, the male rib of one link being adapted to enter the female groove of its neighbor to form lock joints between the link members to maintain the saw units in perfect longitudinal alinement, thus insuring a clean cut through the material.

A further object being to provide an endless chain saw, built up of interchangeable links carried on suitable power sprockets having parallel spaced flanges to guide the saw, the construction of the links being such that little or no tension is required in the operation of sawing metal and other materials.

In the drawings;—

Figure 1 is a side elevation, partly broken away, showing my improved endless saw.

Fig. 2 is a top plan view of the same.

Fig. 3 is a face view, on an enlarged scale, of three links of the saw.

Fig. 4 is an end view of a link.

Fig. 5 is a side view of the same, and

Fig. 6 is a face view thereof.

Referring to the drawings, 10 and 11 designate power or supporting shafts, and 12 and 13 sprockets carried and fixed thereon, bolted or otherwise secured to the sprockets are cheek plates 14 and 15, arranged in pairs at opposite sides thereof, and are extended beyond the sprocket teeth to provide guide flanges 16 and 17, for the endless chain saw, shown at 18.

The saw comprises a plurality of link members 19, each formed with a thick cutting bar 20, having teeth 21 on its outer face, a male rib 22, at one end, and a female groove 23, at the other, the rib and groove being preferably V-shaped in cross section, as shown.

The link body 24 is of one half the thickness of the cutting bar, as clearly shown in Fig. 4, and has enlarged rounded ends 25, perforated as at 26, to receive rivets 27, which are countersunk flush with the sides of the saw structure.

In order to secure a uniform chain movement I limit the length of the sprocket teeth 28, to the pitch line of the chain, as shown in Fig. 1, so that no lost motion or inequality of travel of the saw structure can develop in the cutting operation.

It will be seen that by constructing the links as shown and described, a decidedly thin saw structure can be built up, to produce a comparatively narrow cut, and the thickened cutting bars having interlocking joints each with its neighbor provide reinforcement against vertical and lateral strain.

In the operation of the saw little or no tension is required to keep the chain taut, as the links have abutting faces above or outside of the pivotal point.

What I claim is:—

An endless saw comprising a chain of units each constituted by a web portion of uniform thickness throughout and an integral toothed cutting bar of a thickness twice that of the web portion, as shown.

THADDEUS A. JACKSON.